Figure 5:
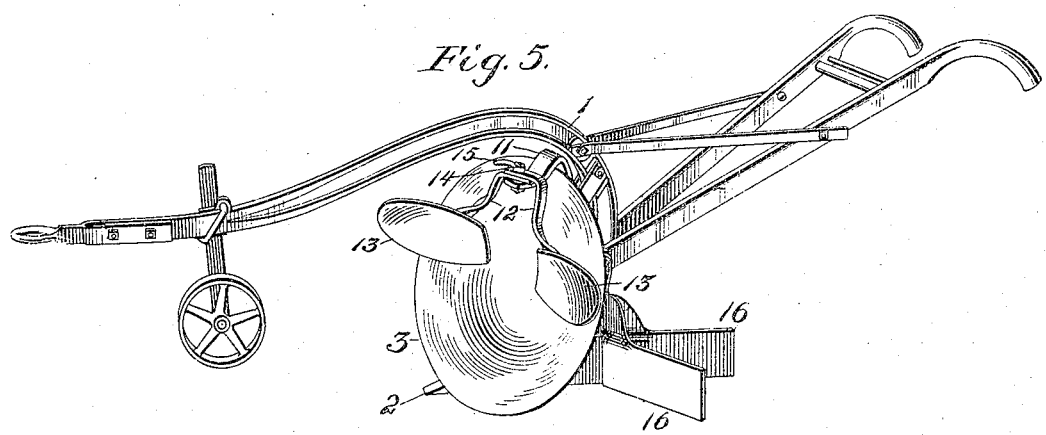

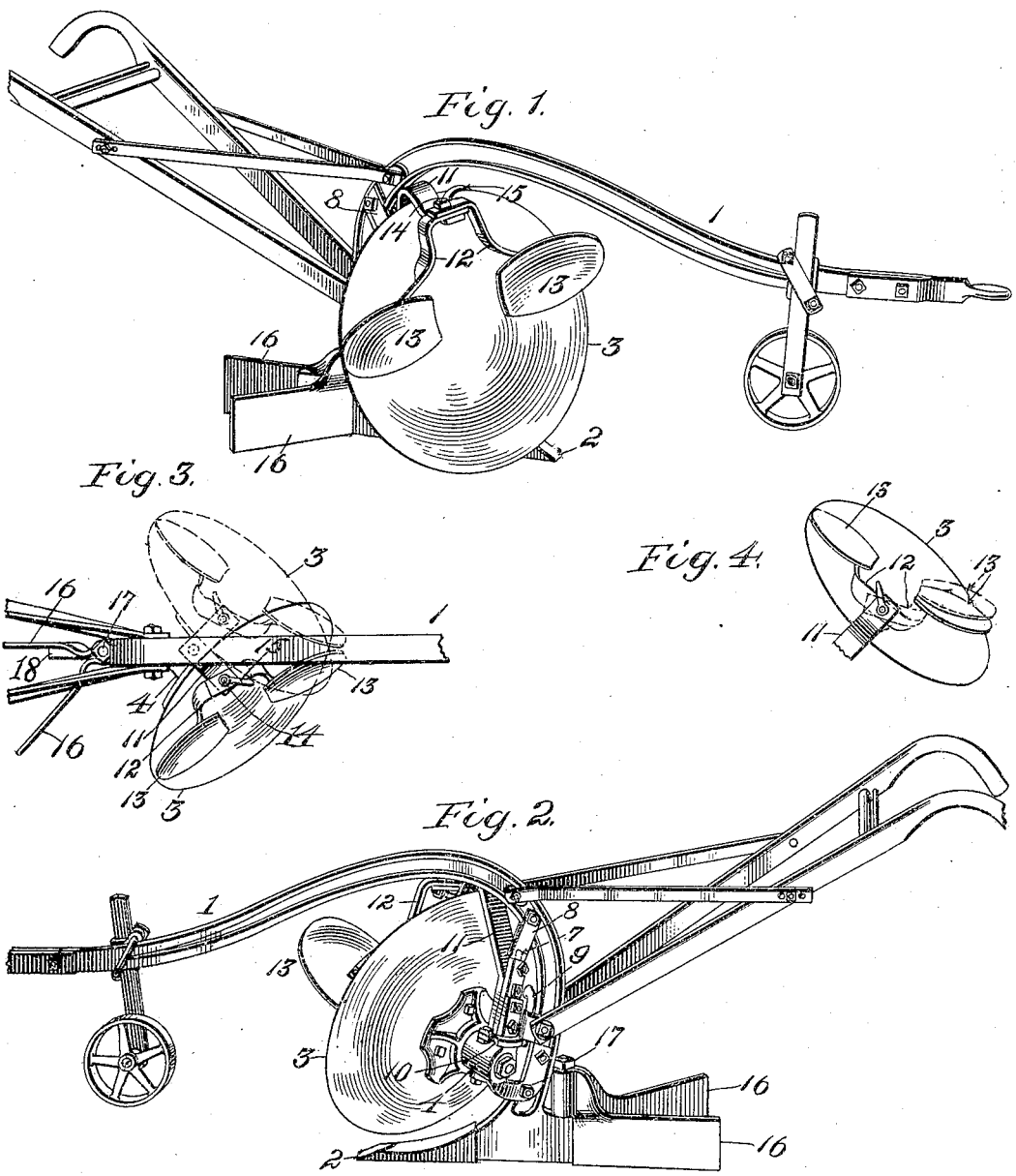

No. 793,715. PATENTED JULY 4, 1905.
C. H. DEERE.
REVERSIBLE DISK PLOW.
APPLICATION FILED DEC. 19, 1904.

2 SHEETS—SHEET 2.

WITNESSES
INVENTOR
Charles H. Deere

No. 793,715.  
Patented July 4, 1905.

UNITED STATES PATENT OFFICE.

CHARLES H. DEERE, OF MOLINE, ILLINOIS, ASSIGNOR TO DEERE & COMPANY, OF MOLINE, ILLINOIS, A CORPORATION OF ILLINOIS.

REVERSIBLE DISK PLOW.

SPECIFICATION forming part of Letters Patent No. 793,715, dated July 4, 1905.

Application filed December 19, 1904. Serial No. 237,434.

*To all whom it may concern:*

Be it known that I, CHARLES H. DEERE, a citizen of the United States, residing at Moline, in the county of Rock Island and State of Illinois, have invented certain new and useful Improvements in Reversible Disk Plows; and I do hereby declare the following to be a full, clear, and exact description of the invention, such as will enable others skilled in the art to which it appertains to make and use the same.

My invention primarily consists of a simple, practicable, and conveniently-handled reversible disk plow having its disk pivotally mounted to swing about an approximately vertically disposed axis and adapted to be locked either to the right or left, in either of which positions the disk is supported at a proper inclination and at an acute angle, so as to cut and throw the furrow outward. Thus the implement can be easily converted from a right-hand to a left-hand plow, or vice versa, simply by unlocking the bearing and swinging or turning the disk about its vertically-disposed axis from one side to the other, thus avoiding all lifting and especially dispensing with the necessity of raising the plow to change the furrow-opener, as in the ordinary reversible moldboard-plows, obtaining marked simplicity of construction and great ease in operating the plow and turning at the end of a furrow, gaining the well-recognized advantage of a revolving moldboard or rotary furrow-opener, and also obviating the usual requirement of changing the clevis or line of draft when the plow is converted from a right-hand to a left-hand implement.

The invention further resides in the combination with such a swinging disk of a scraper or scrapers adapted to swing therewith and automatically to lie against the part of the disk which lifts the soil in whichever position the disk is held; further, in the combination with the disk of a landside running wholly behind the same and a point penetrating into the soil and holding the disk down to its work and steadying the forward travel of the plow; also, in a combined vibrating or swinging landside and furrow-scraper in the form of a trailing pivoted V-shaped member which when the plow is at work automatically assumes one or the other of its two extreme positions, so that one leg or blade thereof is held in line with the forward travel of the plow while the other runs behind the disk and acts as a furrow-cleaner, and, further, in the various novel adjuncts, accessories, and combinations of parts contained in the general construction, substantially as herein described.

A preferred form of embodiment of my invention is represented in the accompanying drawings, which form a part of this specification, and with reference to which the invention will be first fully described and then particularly pointed out and defined in the annexed claims.

Figure 6:
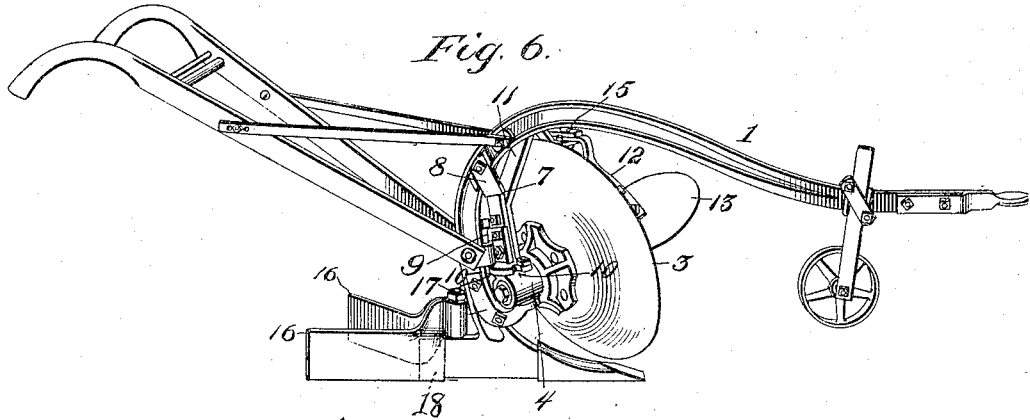
Figure 7:
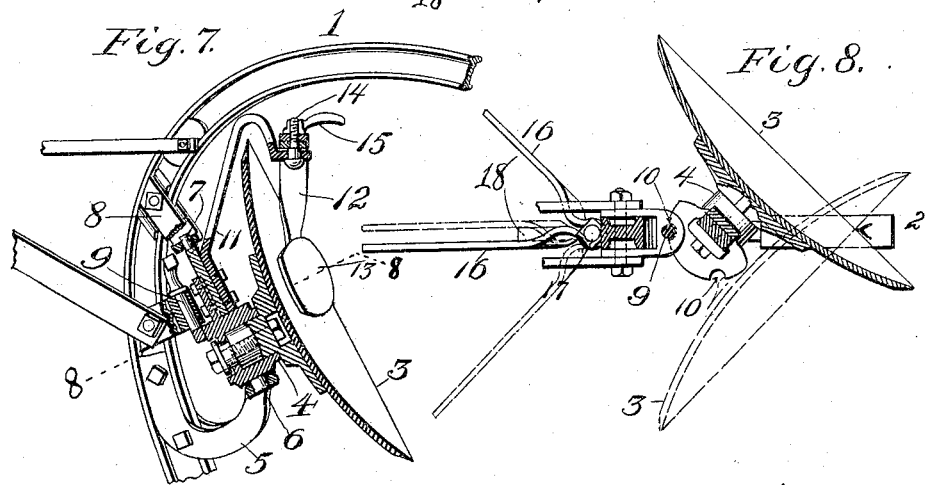
Figure 8:
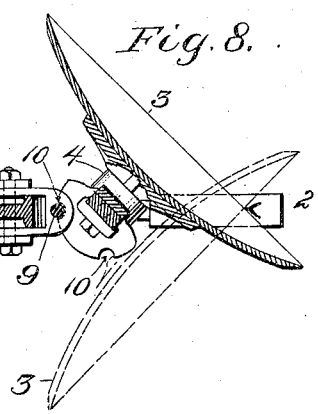

Figure 1 is a perspective view showing the implement as a right-hand plow looking to the working side of the disk. Fig. 2 is a similar view looking at the opposite side of the implement with its disk set in the same position. Fig. 3 is a fragmentary top plan view taken above the disk and indicating by dotted lines the changed position of the disk to throw the furrow to the left. Fig. 4 is a detail view of the disk with its scrapers. Fig. 5 is a perspective view showing the implement as a left-hand plow looking toward the working side of the disk, which is at the opposite side of the beam to that represented in Fig. 1. Fig. 6 is a similar view looking at the opposite side. Fig. 7 shows a fragment of the plow-beam with the disk and its bearing and support in central vertical section. Fig. 8 is a central horizontal section through the disk, taken on line 8 8 of Fig. 7.

As shown in the drawings, the plow is constructed upon a longitudinal central frame, which in the present illustration is the gooseneck-beam 1, having at its rear lower end the flat-sided foot or landside 2, with a forwardly-projecting point which serves the double purpose of penetrating the soil and holding the disk down to its work and acting as a rudder to steady the plow in its forward travel.

The disk 3 has its spindle swiveled to or journaled in the bearing 4, which is pivotally mounted on a central vertically-disposed axis, permitting the disk to be swung around in an arc to face either the right or left, the disk-bearing always maintaining practically the same central location, so that the draft is along a medial longitudinal line whether the plow is throwing the furrow to the right or left. By a "vertically-disposed" axis I refer to one either approximately vertical or inclined more or less as distinguished from a horizontal axis which would necessitate lifting the disk over from one side to the other and cause it to set decidedly off to one side of the beam in order to rest in suitable working position. Actually the axis of the disk-bearing may be inclined, preferably rearwardly upward, as shown in the present illustration, which is to hold the disk at an appropriate inclination to the soil.

5 designates a bracket shown fastened to the lower part of the standard and having a socket to receive a depending spindle 6 of the disk-bearing. The disk-bearing may have also an upstanding spindle 7, journaled in a socket in an upper bracket 8, which renders the construction strong and stable.

When the disk is swung around to either side, it is stopped and locked in desired position by a catch or trigger 9 engaging one of the notches 10, two of which are shown in the disk-bearing at opposite sides of the medial line of the disk-spindle, so that one or the other of such notches comes around into place to receive the catch, according to whether the disk is turned to the right or left. (See Figs. 2, 6, 7, and 8.) The catch 9 is shown as a collared pin held in a socket in a bracket fastened to the standard.

The plow is equipped with two scrapers 13, whose arms 12 are pivotally supported from the overhanging end of an arm or standard 11, rising from the disk-bearing, to which it is rigidly attached, so that the scrapers swing with the disk. The arms 12 are separate, but by means of the tail-nut 15 can be clamped rigidly together after having first been set in desired angular relation, the tightening of such nut not interfering with the free turning of the scrapers as a whole about their pivot to the arm 11. This may be accomplished by having the apertured ends of the arms 12 fitted over a reduced part of the pivot-bolt 14 and having the nut 15 screwed thereon against the said arms, as shown in Fig. 7. Since the arm 11 turns with the disk-bearing, the scrapers always swing with the disk and are held in proper relation to the disk for performing their work, which is to keep the disk clean and also aid somewhat in throwing the furrow. When the implement is used as a right-hand plow, the right-hand scraper automatically seeks its position close to the face of the disk, so that the rising furrow is prevented from adhering thereto, and when used as a left-hand plow the left-hand scraper finds its position against the other side of the disk in the same way by virtue of gravity aided by the pressure of the rising soil against the scraper.

It will be seen that in operation the implement can be changed from a right-hand to a left-hand plow very simply and easily, it being necessary only to unlock the catch or trigger and swing the disk around to its opposite position. There is no lifting of the plow at the end of the furrow, and the labor of the plowman is accordingly diminished, being lightened to such an extent that a boy can handle the implement, when heretofore hillside-plowing has been a man's work. This construction also makes a center-draft plow for the reasons previously noted, so that no change of land is required in the clevis when the disk is thrown from one side to the other, such as is necessary with ordinary hillside-plows as generally constructed.

Preferably I employ in this implement a vibrating or swinging combined landside and furrow-scraper in the form of a pivoted trailing V-shaped device whose legs or blades are indicated by the numeral 16 and one of which legs is always held in the line of forward travel of the plow by pressure of the uncut earth, thus forming a rearward extension of the plow-foot and acting as a landside, while the other leg is held out behind the disk and scrapes out the furrow, and the two legs form a base which helps to sustain the plow in an upright position and to prevent it from tipping over. The device is shown formed from an integral strip bent at its center to provide the rearwardly-diverging blades 16, its central part being also curved upward and formed to inclose the pivot 17 on the plow-foot, the rear end 18 of this foot being located between the forward ends of the blades and serving as a stop to limit the swinging movements of the device. As this device is free to swing from side to side when the disk is turned from one side to the other, the blade which formerly acted as a scraper is moved into the central longitudinal line to serve as a landside, being stopped in such position by the stop or plow-shoe, while the former landside-blade is thrown outward behind the disk, extending diagonally rearward, of course, and thus throwing the plowed ground to one side and cleaning out the bottom of the furrow, the device being entirely self-acting. In Fig. 8 the full lines show the position of the V when the plow is turning a left-hand furrow, while the dotted lines indicate its position when the plow is turning a right-hand furrow.

I claim as my invention and desire to secure by Letters Patent of the United States—

1. A reversible disk plow having, in combination, a plow-standard, and a rotary disk having a vertically-pivoted bearing mounted on the front of said standard to permit swinging the disk from one side to the other, and means for holding the disk in either position comprising a centrally-disposed catch on the standard and a pair of notches in the disk-bearing oppositely and similarly situated with respect to the vertical axis thereof and one of which is engaged by the catch when the disk is swung to the right while the other is engaged thereby when the disk is swung to the left.

2. A reversible disk plow having, in combination, a plow-standard carrying a shoe in the form of a landside and point, a bracket on the front of said standard, and a rotary disk having its bearing pivotally mounted in said bracket to turn on an approximately vertical axis and allow the disk to swing from one side of the landside to the other, the said landside being parallel with the direction of travel of the plow.

3. In a reversible disk plow, the combination with a rotary disk mounted to swing to opposite sides thereof, of a pair of rigidly-connected scrapers whose connection is carried by a pivot which swings with the disk, said connection allowing only one scraper at a time to engage the face of the disk, and the pivot of such connection allowing the right-hand scraper to come close to the disk when turned to the right and the left-hand scraper to come close to the disk when turned to the left.

4. In a reversible disk plow, the combination with a rotary swinging disk, of an arm which swings with the disk, and two scraper-carrying arms capable of being adjusted angularly with relation to each other and secured rigidly together and pivoted as a whole to the said arm which swings with the disk.

5. In a reversible disk plow, the combination with a rotary swinging disk or moldboard, of a trailing pivoted swinging V-shaped member the legs of which diverge rearwardly and one leg or blade of which is automatically held in the line of forward travel to act as a landside while the other runs behind the disk to act as a furrow-scraper, the said V-shaped member automatically shifting or swinging with the disk.

6. In a reversible disk plow, the combination of a frame, a rotary disk mounted to swing to opposite sides thereof, the plow-foot behind the disk, and a trailing V-shaped device pivoted at its apex to said foot and adapted to swing horizontally, its movements being limited by a stop, whereby one leg or blade is automatically held in the line of forward travel to act as a landside while the other projects diagonally outward to act as a scraper.

7. In a reversible disk plow, the combination of a plow-standard having a bracket, and a rotary disk the bearing of which has a depending spindle in the bracket, thus allowing the disk to be reversed or swung from one side to the other, and means for locking the disk-bearing in the opposite positions thereof for holding the disk in its opposite working positions.

8. In a reversible disk plow, the combination of a plow-standard having a bracket, a rotary disk whose bearing is pivotally mounted in said bracket to allow reversing or swinging of the disk from and to opposite sides, a second bracket on the standard having a socket and a centrally-disposed locking-pin therein, and oppositely-related notches or recesses in the disk-bearing one of which is adapted for engagement by said locking-pin when the disk is turned to throw the furrow to the right while the other is adapted for engagement thereby when the disk is turned to throw the furrow to the left.

9. In a reversible disk plow, the combination of a plow-standard, a rotary disk whose bearing is mounted thereon to turn on an approximately vertically disposed axis, an upright arm rigid with the disk-bearing, and a pair of scrapers having a rigid connection medially pivoted to said arm, said scrapers being so disposed that only one at a time can contact with the working face of the disk.

10. In a reversible disk plow, the combination of a plow-standard having a foot provided with a point, a reversible or swinging disk having its bearing mounted at the front of said standard, and a trailing and swinging landside and furrow-scraper comprising rearwardly-divergent connected blades having a front vertically-disposed pivot at the rear of the plow-foot, and a stop located between the blades.

In testimony whereof I affix my signature in presence of two witnesses.

CHARLES H. DEERE.

Witnesses:
CHARLES H. POPE,
FRED H. COOPER.